(12) United States Patent
Barth et al.

(10) Patent No.: US 8,121,947 B1
(45) Date of Patent: Feb. 21, 2012

(54) METHODS AND SYSTEMS FOR ELECTRONIC TRANSFER OF FINANCIAL ACCOUNTS BETWEEN FINANCIAL INSTITUTIONS

(75) Inventors: Ryan Ray Barth, San Antonio, TX (US); Jeffrey Walton Easley, San Antonio, TX (US); Teddy Joseph Edmond Voutour, Helotes, TX (US); Michael Albert Luby, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 285 days.

(21) Appl. No.: 11/548,073

(22) Filed: Oct. 10, 2006

(51) Int. Cl.
G06Q 40/00 (2006.01)
(52) U.S. Cl. .................................................. 705/40
(58) Field of Classification Search ............... 705/35–40
See application file for complete search history.

(56) References Cited

U.S. PATENT DOCUMENTS

| | | | | |
|---|---|---|---|---|
| 5,913,202 | A * | 6/1999 | Motoyama | 705/36 R |
| 7,606,752 | B2 * | 10/2009 | Hazlehurst et al. | 705/35 |
| 7,848,974 | B1 * | 12/2010 | Sheehan | 705/35 |
| 2002/0095651 | A1 * | 7/2002 | Kumar et al. | 717/104 |
| 2003/0225688 | A1 * | 12/2003 | Dobbins | 705/39 |
| 2004/0210517 | A1 | 10/2004 | Brooks et al. | |
| 2005/0021456 | A1 * | 1/2005 | Steele et al. | 705/39 |
| 2005/0069841 | A1 | 3/2005 | Lee et al. | |
| 2005/0149436 | A1 | 7/2005 | Elterich | |
| 2006/0116949 | A1 * | 6/2006 | Wehunt et al. | 705/35 |
| 2007/0124242 | A1 | 5/2007 | Reis | |
| 2007/0130065 | A1 | 6/2007 | Staab et al. | |
| 2008/0228638 | A1 | 9/2008 | Scipioni et al. | |

OTHER PUBLICATIONS

US Bullion Exchange, "Trading INformation & FAQ", Feb. 20, 2006, pp. 1-4.*
Wolfe, Daniel, "Yodlee Tool Loosens Stickiness of Online Banking", http://corporate.yodlee.com/solutions/personal_finance/billpay_accountaccelerator.htm, Sep. 19, 2006 (2 pages).
"About Yodlee", Press Room, http://corporate.yodlee.com/company/press_room/previous/2006/09/onlinebillpay.html, Sep. 19, 2006, (4 pages).
McCune, Jenny C., "Your online bill payment options", http://www.bankrate.com/brm/news/ob/20040115a1.asp, Oct. 4, 2006, (2 pages).
TSAINC.COM, "Products: ACI Money Transfer System", (May 24, 2007), 3 pages.
Flexo, "Rule for Building Wealth: Make Saving Automatic", (Dec. 18, 2006), 8 pages.
Media General, "Automatic Dividend Reinvestment and Stock Purchase Plan", (May 24, 2007), 12 pages.

* cited by examiner

*Primary Examiner* — Thu-Thao Havan
*Assistant Examiner* — Jennifer Liu
(74) *Attorney, Agent, or Firm* — Perkins Coie LLP (57) ABSTRACT

A method of transferring a financial account from an existing financial institution to a new financial institution includes receiving a customer request for financial account transfer, determining information regarding the existing financial institution using information stored at the new financial institution, receiving, via an aggregation tool, information regarding the financial account, determining financial obligations associated with the financial account using the received information, and populating a database of the new financial institution to reflect the determined financial obligations.

33 Claims, 10 Drawing Sheets

Confirm page continued.

Switch to FSBE BillPay

(1) Select Bank   (2) Verify Bills to Switch   (3) Confirm

We can retrieve and set up your current web bill payment information in just a few clicks.

Tell us about your current account and provide access information to take advantage of our automatic bill pay switching feature.

We'll retrieve and switch the current list of bills you pay online.

Current bank you use for bill paying: [- Select - ▼]

Current bank user name or ID: [                    ]

Current bank password: [                    ]

Please re-enter password: [                    ]

Be assured that FSBE values your privacy and protects your information every step of the way.

Terms and Conditions

You should carefully read the agreement for a full explanation of the EasySwitch® <u>terms and conditions</u>.

○ Yes, I agree.

○ No, I disagree. (This will cancel this application.)

[Next]

Switch to FSBE BillPay ( 1 ) Select Bank    ( 2 ) Verify Bills to Switch    ( 3 ) Confirm

Switch These Bills to FSBE BillPay

We have determined that you currently make the following payments online. These will be switched to FSBE and set up for BillPay.

| Biller | Account # | Last Payment Amount | Last Payment Date |
|---|---|---|---|
| Time Warner Cable | #****5678 | $123.45 | 06/01/2006 |
| CPS Power | #****5432 | $43.21 | 06/01/2006 |
| Sprint PCS Phone | #******4567 | $124.37 | 06/10/2006 |
| CITI Bank Visa | #1**--**-4321 | $578.92 | 06/15/2006 |

Note: Payments you have scheduled within the next seven days will be made by your current bank. You should leave sufficient funds in the account to cover any such payments.

By clicking "Submit," you authorize and direct FSBE to switch your bill payments from your current bank to FSBE BillPay.

[Previous] [Cancel] [Submit]

FIG. 7D

Switch to FSBE BillPay

1. Select Bank  2. Verify Bills to Switch  3. Confirm

You have successfully moved your bill payments to FSBE BillPay June 5, 2006, 11:34 a.m. CT. You may want to print this page for your records.

Bills you have switched

| Bills | Account Number | Next Payment Date |
|---|---|---|
| Time Warner Cable | #****5678 | 09/01/2006 |
| CPS Power | #*****5432 | 09/15/2006 |
| Sprint PCS Phone | #*******4567 | |
| CITI Bank Visa | #1**--**-4321 | |

Direct Deposits and Automatic Withdrawals

For your convenience, here are recurring deposits and withdrawals that occur within your current bank account. We are providing the contact information if you would like to move these to your new FSBE checking account.

| Withdrawal/Deposit | Last Amount | Last Date | Contact Information |
|---|---|---|---|
| Department of Defense | $1,329.52 | 06/01/2006 | mypay.dfas.mil |
| Sarah's College Savings Account | ($200.00) | 06/01/2006 | Wells Fargo<br>1234 State Street<br>Memphis, TN 12345<br>123-456-7890 |
| John's College Savings Account | ($200.00) | 06/01/2006 | Wells Fargo<br>1234 State Street<br>Memphis, TN 12345<br>123-456-7890 |

Account Services
- Confirm payment dates and amounts at FSBE BillPay
- Transfer funds Learn More

FIG. 7E

Confirm page continued.

| | | |
|---|---|---|
| Frost Bank Savings | $1,923.45 05/01/2006 | www.frostbank.com |
| Osage Oil | $150.00 03/31/2006 | Ramparts Drilling Inc.<br>1234 State Street<br>Houston, TX 12345<br>123-456-7890 |
| Vanguard Money Market | ($500.00) 03/31/2006 | www.vanguard.com |

Printer-Friendly Version

What happens next

- Payments scheduled to be paid in the next 7 days will be made by your previous bank.
- You may want to close your non-FSBE account after all automatic arrangements have been moved and all outstanding checks are cleared.

METHODS AND SYSTEMS FOR ELECTRONIC TRANSFER OF FINANCIAL ACCOUNTS BETWEEN FINANCIAL INSTITUTIONS

CROSS-REFERENCE TO RELATED APPLICATIONS

This application is related to subject matter to, and incorporates by reference herein in its entirety, each of the following:

U.S. patent application Ser. No. 11/548,004 entitled "Methods and Systems for Electronic Transfer of Financial Accounts Between Financial Institutions" and filed on the same date as this application;

U.S. patent application Ser. No. 11/548,018 entitled "Methods and Systems for Electronic Transfer of Financial Accounts Between Financial Institutions" and filed on the same date as this application;

U.S. patent application Ser. No. 11/548,029 entitled "Methods and Systems for Electronic Transfer of Financial Accounts Between Financial Institutions" and filed on the same date as this application; and U.S. patent application Ser. No. 11/548,049 entitled "Methods and Systems for Electronic Transfer of Financial Accounts Between Financial Institutions" and filed on the same date as this application.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

1. Technical Field

Disclosed embodiments relate generally, by way of example and not limitation, to methods and systems that enable a financial services business entity to provide a service to individuals for transferring their financial accounts and financial obligations associated therewith in an automated manner from a financial institution they are currently utilizing to the financial services business entity.

2. History of Related Art

Individuals often utilize the services of multiple financial institutions for maintaining their finances. The services may be, for example, a checking account, a savings account, a retirements savings account, and the like. An individual may utilize the services of multiple financial institutions for several reasons such as, for example, convenience of location of the financial institutions, customer service provided by the financial institutions, rewards provided by the financial institutions, and the like. When the individual decides to switch any one of their accounts from a financial institution they are currently utilizing to another financial institution, the process involved with such a transfer is often complicated.

An account transfer from one financial institution to another financial institution often requires the individual to physically submit signed documentation that may be, for example, in paper form to the financial institution the individual is currently utilizing. More complications often exist if the individual utilizes the services of the financial institution to pay a plurality of bills electronically. In such an instance, an account transfer typically requires the individual to manually enter electronic bill payment information with the new financial institution. The electronic bill payment information may include, for example, payee name, date of payment, amount of payment, payee account number, and the like. The requirements of physically submitting signed documents and manually entering the electronic bill payment information with the new financial institution are time-consuming and inconvenient.

SUMMARY

This summary is not intended to represent each embodiment or every aspect; the following paragraphs of this summary provide representations of some embodiments as aspects thereof.

A method of transferring a financial account from an existing financial institution to a new financial institution includes receiving a customer request for financial account transfer, determining information regarding the existing financial institution using information stored at the new financial institution, receiving, via an aggregation tool, information regarding the financial account, determining financial obligations associated with the financial account using the received information, and populating a database of the new financial institution to reflect the determined financial obligations.

A system for transferring a financial account from an existing financial institution to a new financial institution includes a processor and a memory interoperably coupled to the processor. The processor is adapted to receive a customer request for financial account transfer, determine information regarding the existing financial institution using information stored at the new financial institution, receive, via an aggregation tool, information regarding the financial account, determine financial obligations associated with the financial account using the received information, and populate a database of the new financial institution to reflect the determined financial obligations.

An article of manufacture for transferring a financial account from an existing financial institution to a new financial institution includes at least one computer readable medium and processor instructions contained on the at least one computer readable medium. The processor instructions contained on the at least one computer readable medium are configured to be readable from the at least one computer readable medium by at least one processor and thereby cause the at least one processor to operate as to receive a customer request for financial account transfer, determine information regarding the existing financial institution using information stored at the new financial institution, receive, via an aggregation tool, information regarding the financial account, determine financial obligations associated with the financial account using the received information, and populate a database of the new financial institution to reflect the determined financial obligations.

BRIEF DESCRIPTION OF THE DRAWINGS

A more complete understanding of the methods and systems may be obtained by reference to the following Detailed Description when taken in conjunction with the accompanying Drawings wherein.

DETAILED DESCRIPTION

The present methods and systems will now be described more fully with reference to the accompanying drawings in which various embodiment(s) are shown. The methods and systems may, however, be embodied in many different forms and should not be construed as limited to the embodiments set forth herein; rather, these embodiments are provided so that this disclosure will be thorough and complete, and will fully convey the scope of the systems and methods to those skilled in the art.

Figure 1:
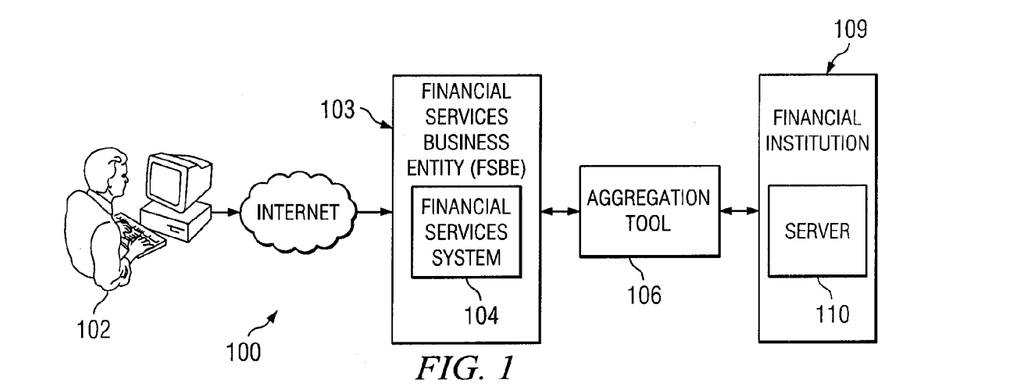
FIG. 1 is a block diagram of a system for transferring a financial account between financial institutions.

FIG. 1 is a block diagram of a system 100 for electronically transferring a financial account and financial obligations associated therewith between financial institutions. The system 100 includes a financial services business entity (FSBE) 103 connected to an aggregation tool 106. The FSBE 103 includes a financial services system 104. The aggregation tool 106 is connected to a financial institution 109. The financial institution 109 includes a server 110. In the context of this patent application, the term financial services business entity (FSBE) refers to a financial institution that provides financial services to customers.

The FSBE 103 is adapted to provide services to customers for transferring their financial accounts and financial obligations associated therewith in an automated manner from the financial institution 109 (which the customers are currently utilizing) to the FSBE 103. The FSBE 103 and the financial institution 109 may be, for example, banks, trust companies, credit unions, and the like.

The FSBE 103 provides a customer 102 the ability to electronically transfer financial accounts such as, for example, a checking account, a savings account, an investment account, and the like from the financial institution 109 to the FSBE 103. In addition, the FSBE 103 also provides the customer 102 the ability to electronically transfer electronic bill payment information, which may include, for example, payee name, payee payment amount, date of payment, payee account number, payee phone number, and the like from the financial institution 109 to the FSBE 103.

In a typical scenario, the customer 102 sends a request to the FSBE 103 to transfer a checking account and financial obligations associated therewith to the FSBE 103 from the financial institution 109. The financial obligations associated with the checking account of the customer 102 may include, for example, direct deposit information, electronic bill payment information, automated withdrawal information, automatic transfer of funds information, and the like. After the FSBE 103 receives the request of the customer 102, the FSBE 103 utilizes information stored with the financial services system 104 to obtain a name and location of the financial institution 109. The FSBE 103 further utilizes the aggregation tool 106 to obtain financial information pertaining to the checking account of the customer 102 from the financial institution 109.

The FSBE 103 reviews the financial information obtained via the aggregation tool 106 and populates the financial services system 104 with the financial information of the customer 102. The financial information of the customer 102 may include, for example, financial institution name, account type, account number, account balance, direct deposit information, electronic bill payment information, automated withdrawal information, automatic transfer of funds, and the like. A customer account at the FSBE 103 to which the financial information of the customer 102 is transferred may be, for example, an existing financial account or a newly-opened financial account. Responsive to approval from the customer 102, the FSBE 103 initiates a funds transfer from the financial institution 109 to the FSBE 103 via a central banking system (not explicitly shown).

Figure 2:
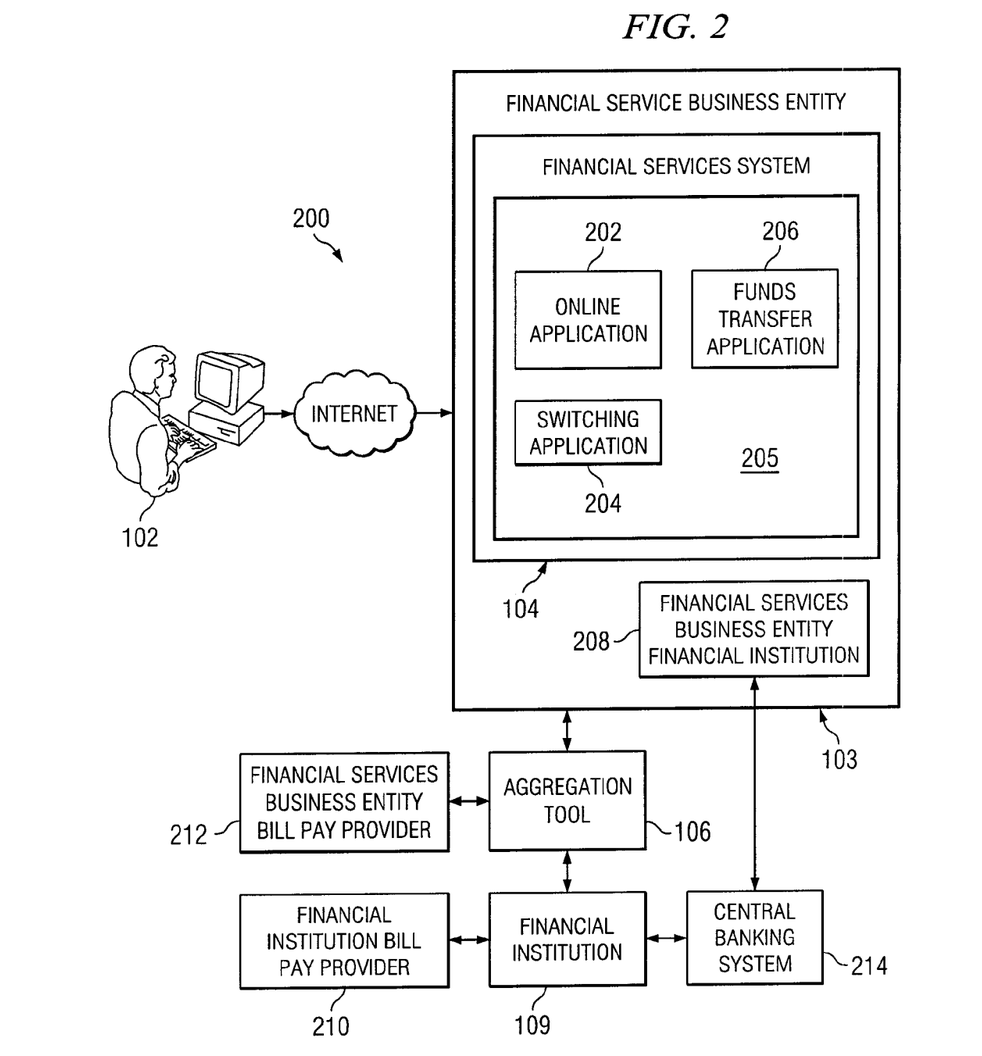
FIG. 2 is a functional block diagram of a system for transferring a financial account between financial institutions.

FIG. 2 is a functional block diagram of a system for transferring a financial account between financial institutions. The block diagram 200 depicts the FSBE 103 connected to the aggregation tool 106. The aggregation tool 106 is connected to the financial institution 109 and to an FSBE bill pay provider 212. The financial institution 109 is also connected to a financial institution bill pay provider 210. The bill pay providers 210 and 212 may be, for example, operated by CHECKFREE. The FSBE 103 and the financial institution 109 are further connected to a central banking system 214. The central banking system 214 acts as a clearinghouse for funds transfers between financial institutions. In the United States, the central banking system 214 may be, for example, the Federal Reserve System.

The FSBE 103 includes the financial services system 104. The financial services system 104 includes a financial services system server 205. The financial services system server 205 has resident thereon an online application 202, a switching application 204, and a funds transfer application 206. The FSBE 103 further includes a FSBE financial institution 208. In a typical embodiment, the FSBE financial institution 208 may be, for example, a bank, trust company, credit union, or the like.

In a typical scenario, the customer 102 accesses the online application 202 to initiate transfer of an account (e.g., a checking account) and the financial obligations associated therewith to the FSBE 103 from the financial institution 109. The online application 202 may be, for example, used in conjunction with a website operated by the FSBE 103. Responsive to the customer 102 selecting the switching application 204, which application initiates a financial account transfer between the financial institutions, the FSBE utilizes information previously stored with the financial services system 104 to obtain, for example, a name and location of the financial institution 109. The information stored with the financial services system 104 may include, for example, payment records (e.g., recurring deposits or payments) associated with the customer 102. The information helps the FSBE 103 to identify, for example, the name and location of the financial institution 109. For example, the financial services system 104 may have stored information reflecting deposits from an account of the customer 102 at a particular financial institution.

The FSBE 103 utilizes the aggregation tool 106 to obtain financial account details of the customer 102 from the financial institution 109. The aggregation tool 106 may be, for example, an account aggregator tool operated by a third party entity or by the FSBE 103. The aggregation tool 106 may be resident within the FSBE 103 or may be resident on a third party entity system. The aggregation tool 106 is adapted to provide account aggregation. The aggregation tool 106 is typically able to obtain information regarding financial obligations associated with the financial accounts. The information regarding financial obligations may include, for example, direct deposit information, electronic bill payment information, automated withdrawal information, automated transfer of funds information, and the like.

Account aggregation is a service that allows financial account information to be collected. Financial account information may include information regarding bank accounts, savings and investment accounts, mortgages, credit card accounts, personal loans, and the like. The aggregation tool 106 provides account aggregation services by gathering information, for example, from websites of financial institutions where the customer 102 currently has financial accounts (e.g., financial institution 109). The aggregation tool 106 utilizes security information of the customer 102 to gain access to financial account information at the financial institution 109 (e.g., via the online application 202). The security information may include, for example, any of a user name, a customer number, a password, and an access code. The security information may further include an extra layer of security in case an unknown person attempts to access an online account. The extra layer of security may include, for example, site key previously chosen by the customer 102. The security information is typically provided by the customer 102 to the FSBE 103. In a typical scenario, the FSBE 103 forwards the security information obtained from the customer 102, with authorization from the customer 102, to the aggregation tool 106 to enable the aggregation tool 106 to perform account aggregation services.

After obtaining the financial account information, the aggregation tool 106 forwards the financial account information to the FSBE 103. The FSBE 103 receives the financial account information and performs an analysis thereof. The analysis may include, for example, analysis of dates of direct deposits, automatic withdrawal schedule, dates of withdrawals, vendors associated with the automatic withdrawals, electronic bill payment information, dates of bill payments, amounts of payment, payee names, payee account numbers, amount of balance transfer, and the like. Responsive to the analysis of the financial account information, the FSBE 103 populates the financial services system 104 to automatically update the account of the customer 102 with the FSBE 103.

In a typical embodiment, if the customer 102 agrees to switch the financial account at the financial institution 109 and the electronic bill payments associated therewith to the FSBE 103, the FSBE 103 utilizes the financial account information to determine a reasonable balance amount that should remain in the financial account of the customer 102 at the financial institution 109 to cover, for example, pending electronic bill payments. A remaining balance is then typically transferred from the financial institution 109 to the FSBE financial institution 208 via the central banking system 214. The balance transfer between the financial institution 109 and the FSBE financial institution 208 may be, for example, an Automated Clearing House (ACH) transfer. The ACH transfer represents the electronic exchange of funds between the two financial institutions. In a typical embodiment, communication between the aggregation tool 106 and the FSBE 103 takes place as quickly as system resources permit (i.e., in real-time).

Figure 3:
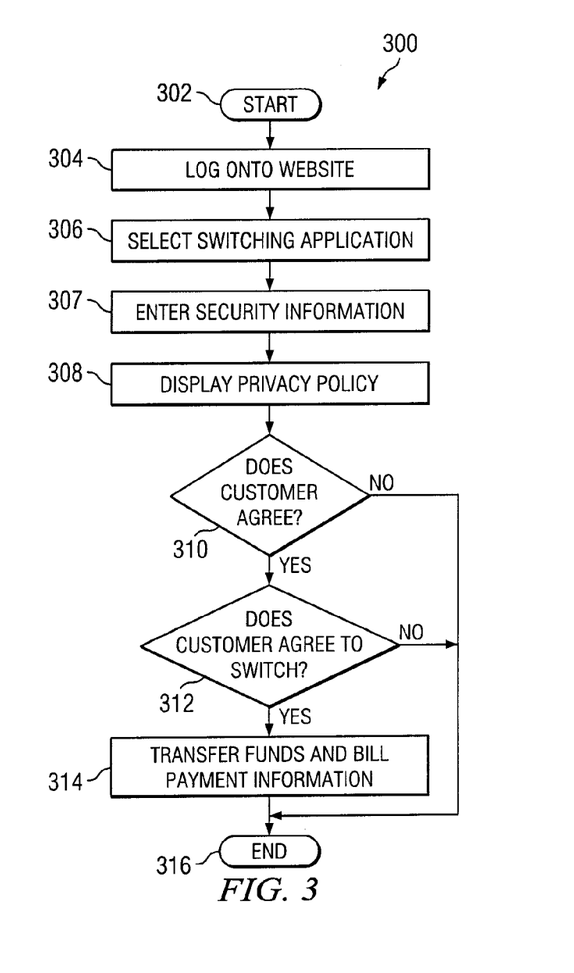
FIG. 3 is a flow diagram illustrating a process for transferring a financial account between financial institutions.

FIG. 3 is a flow diagram illustrating a process for electronically transferring a financial account between financial institutions. A flow 300 is based on a case in which the customer 102 has an existing financial account with the FSBE 103. The process flow 300 starts at step 302. At step 304, the customer 102 logs onto an FSBE website that allows the customer 102 to interact with the online application 202 and accesses financial account details associated with a financial account of the customer 102 at the FSBE 103. The customer account access may be achieved by, for example, the customer 102 entering a user name and password. After the customer 102 accesses the FSBE website, the FSBE account switching application 204 is launched at step 306. The FSBE account switching application 204 may be, for example, accessible by the customer 102 via a selectable tab. Selection of the FSBE account switching application 204 allows the FSBE 103 to initiate an electronic transfer by the customer 102 from the financial institution 109 to the FSBE 103. At step 307, the customer 102 enters personal identification information (e.g., a user name and password) to allow FSBE 103 to access account information of the customer 102 with the financial institution 109 using the aggregation tool 106. At step 308, the FSBE 103 displays a privacy policy. At step 310, it is determined whether the customer 102 agrees with the privacy policy. If the customer 102 declines the privacy policy at step 310, the process flow 300 ends at step 316. However, if at step 310 the customer 102 agrees to the privacy policy, the process flow 300 proceeds to step 312.

At step 312, the customer 102 is given an option to transfer the financial account and the financial obligations associated with the financial account at the financial institution 109 to the FSBE 103. The financial obligations may be, for example, direct deposit information, electronic bill payment information, automated withdrawal information, automatic transfer of funds information, and the like. If at step 312 the customer 102 declines the option, the process flow 300 ends at step 316. However, if at step 312 the customer 102 accepts the option, the process flow 300 proceeds to step 314. At step 314, the FSBE 103 initiates electronic funds transfer and electronic bill payment information transfer from the financial institution 109 to the FSBE financial institution 208. The FSBE 103 initiates the funds transfer from the financial institution 109 to the FSBE financial institution 208 via the central banking system 214. At step 316, the process ends.

Figure 4A:
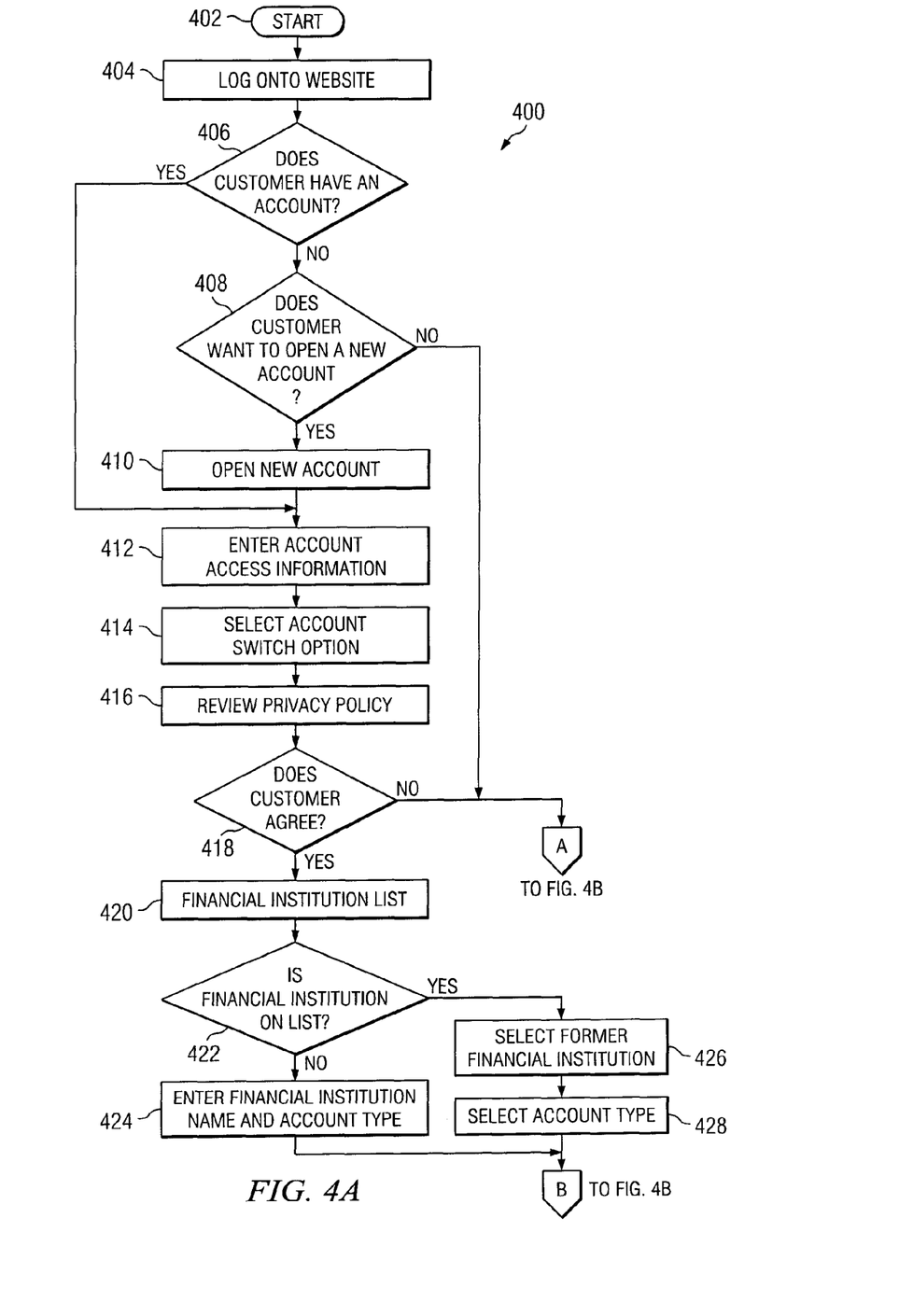
FIG. 4 is a flow diagram illustrating a detailed process for transferring a financial account between financial institutions.
Figure 4B:
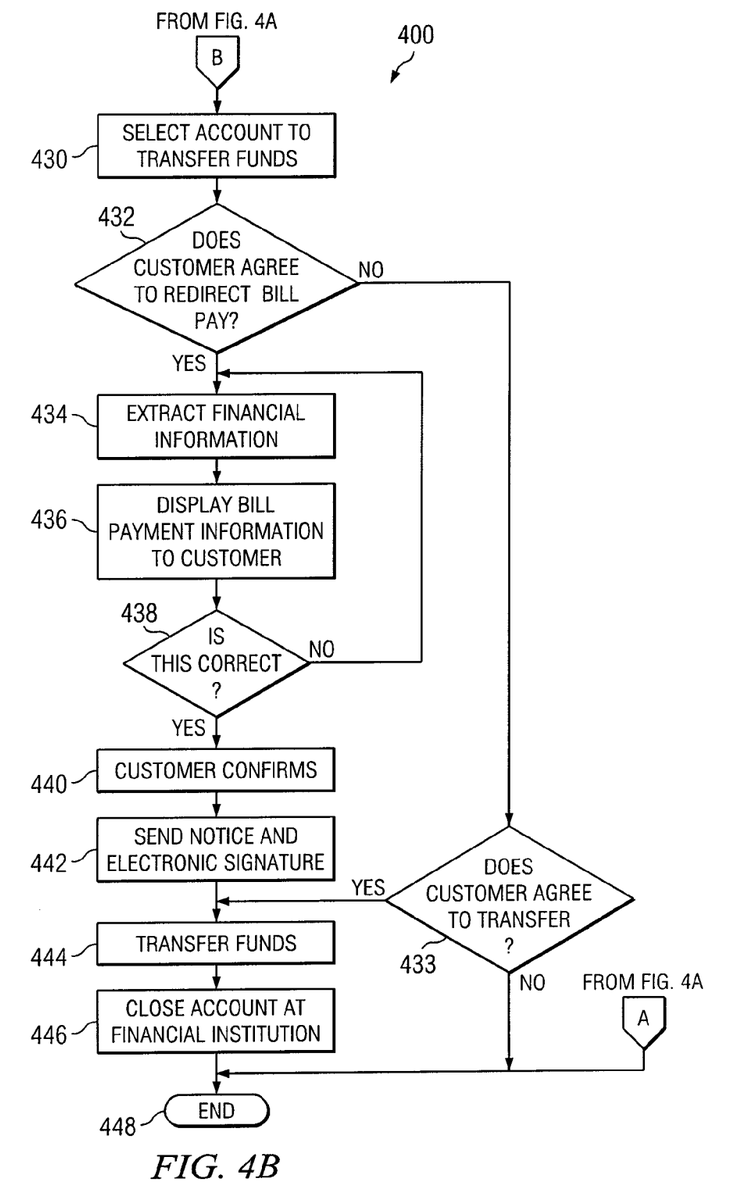

FIG. 4 is a flow diagram illustrating in further detail a process flow for transferring an account from the financial institution 109 to the FSBE 103. FIGS. 7A-7E are illustrative interface screen shots illustrating various aspects of the process flow.

A process flow 400 starts at step 402. At step 404, the customer 102 accesses an FSBE website, which may be, for example, operative via the online application 202. At step 406, it is determined whether the customer 102 has a financial account with the FSBE 103. If it is determined at step 406 that the customer 102 does not have a financial account with the FSBE 103, the process flow 400 proceeds to step 408. At step 408, it is determined whether the customer 102 desires to open a new financial account with the FSBE 103. If it is determined at step 408 that the customer 102 does not desire to open a new financial account with the FSBE 103, the process flow 400 ends at step 448. However, if it is determined at step 408 that the customer 102 desires to open a new financial account with the FSBE 103, the process flow 400 proceeds to step 410. At step 410, a new financial account is opened for the customer 102 by the FSBE 103. The new financial account may be, for example, a checking account or a savings account. Those having skill in the art will appreciate that opening a new financial account is typically performed using standard procedures that may include obtaining personal information from the customer 102. The personal information may include, for example, name, address, social security number, citizenship, and the like. From step 410, the process flow 400 proceeds to step 412. If it is determined at step 406 that the customer 102 already has an account with the FSBE 103, the process flow 400 proceeds to step 412.

Figure 7A:
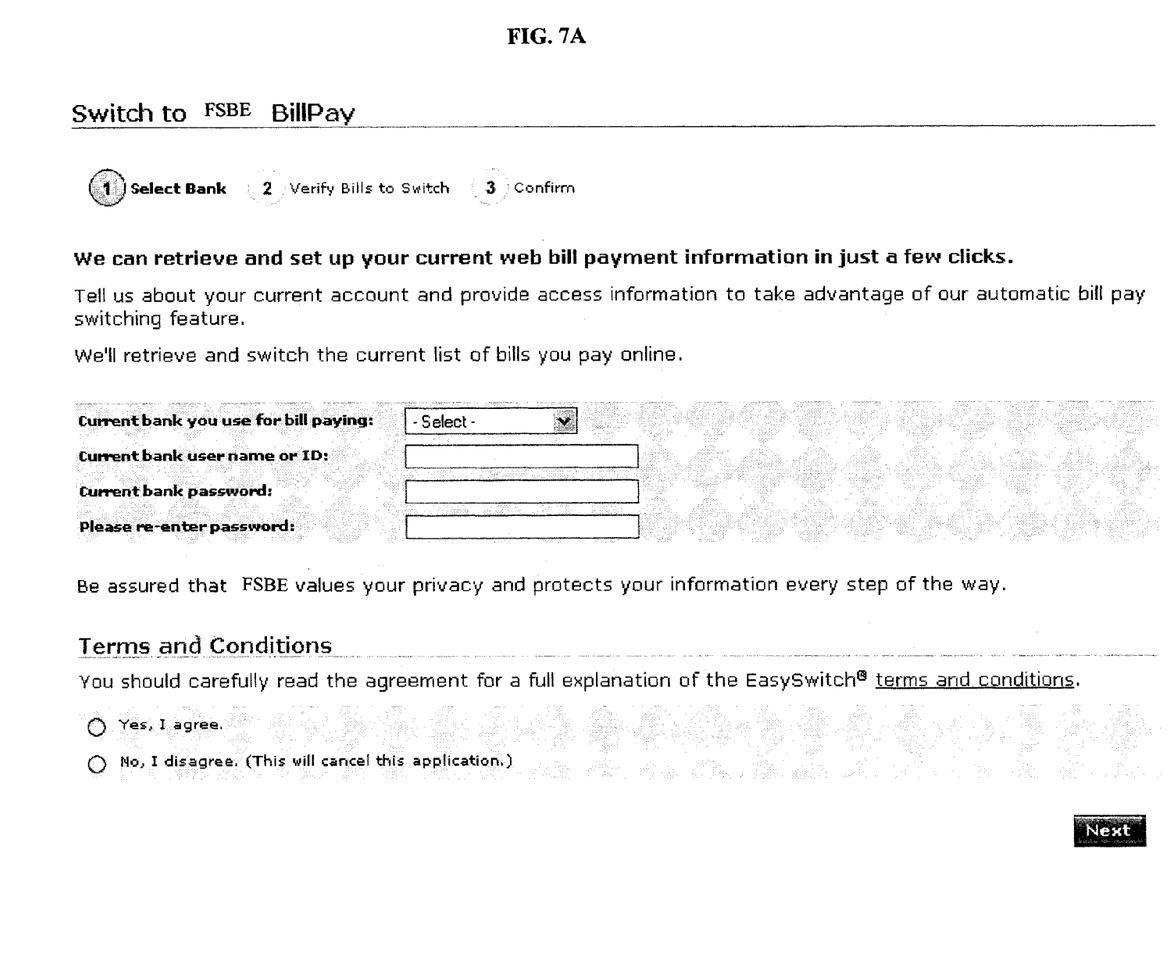
FIGS. 7A-7E are illustrative interface screen shots pertinent to various aspects of the flow diagram of FIG. 4.
Figure 7B:
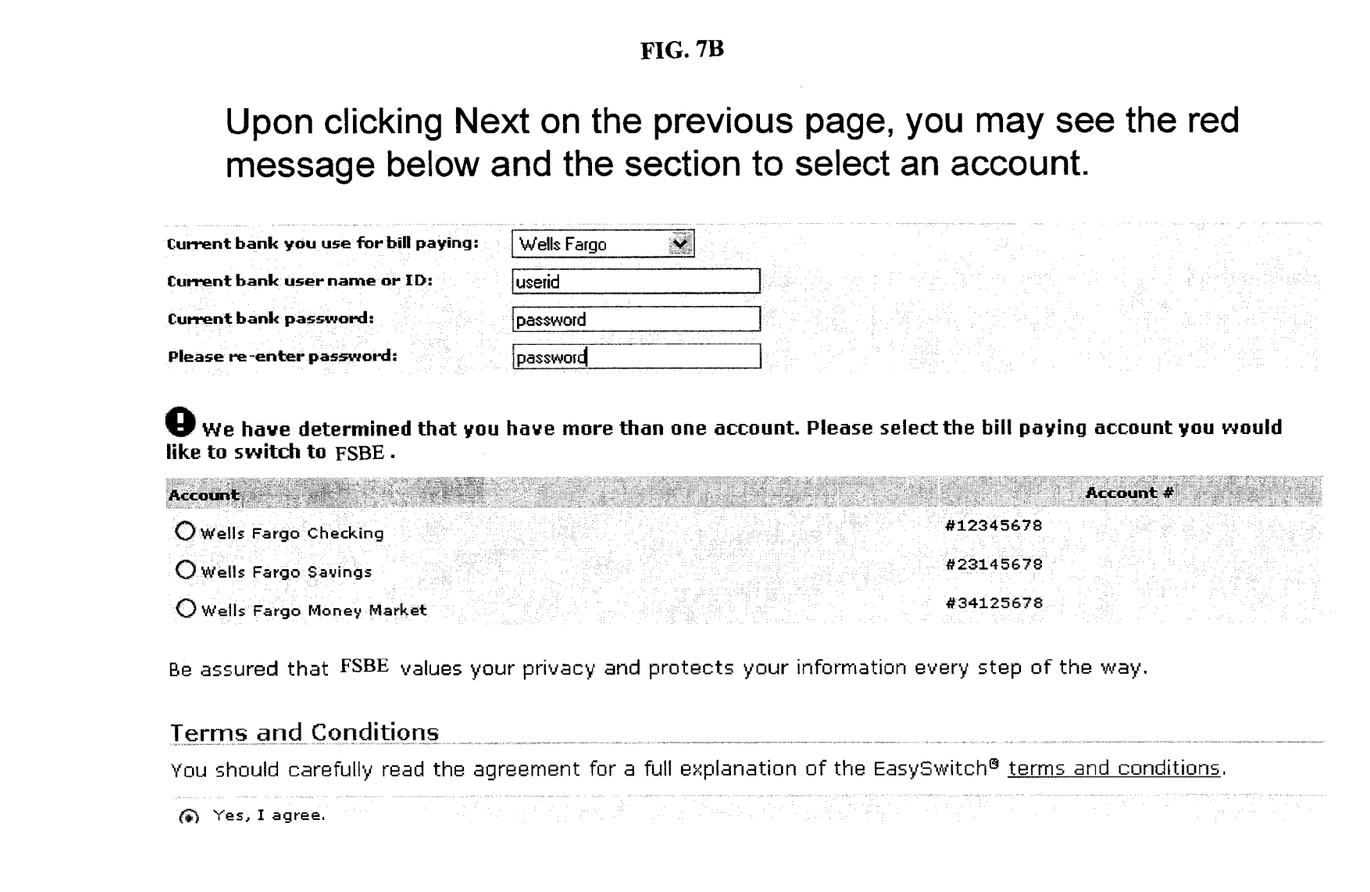

At step 412, the customer 102 enters personal identification information pertaining to the financial account at the financial institution 109 (e.g., a user name and password) to allow the FSBE 103 to access account information of the customer 102 with the financial institution 109 via the aggregation tool 106. FIG. 7A is an illustrative interface screen shot relative to step 412. After the customer 102 enters the personal identification information (e.g., via the online application 202), the FSBE account switching application 204 is displayed. Selection of the FSBE account switching application 204 allows the FSBE 103 to initiate electronic transfer of the financial account of the customer 102 from the financial institution 109 to the FSBE 103. At step 414, the customer 102 activates the FSBE account switching application 204. At step 416, the customer 102 reviews a privacy policy. At step 418, it is determined whether the customer 102 agrees with the privacy policy. If at step 418 the customer 102 declines the privacy policy, the process flow 400 ends at step 448. However, if the customer 102 agrees to the privacy policy at step 418, the process flow 400 proceeds to step 420. FIGS. 7A-7B are illustrative interface screen shots relative to steps 418, 420, and 448.

At step 420, the FSBE 103 provides a list of financial institution names to the customer 102. The list of financial institution names may include a list of names of financial institution the customer 102 previously utilized or is currently utilizing. The list of financial institution names is typically determined by the FSBE 103 utilizing the information stored within the financial services system 104.

At step 422, it is determined whether the name of the financial institution 109 is included in the list of financial institution names provided to the customer 102 at step 420. If it is determined at step 422 that the name of the financial institution 109 is not included in the list provided at step 420, the process flow 400 proceeds to step 424. At step 424, the customer 102 enters information related to the financial institution 109. The entered information may include, for example, financial institution name, financial institution location, type of account, and the like. From step 424, the process flow 400 proceeds to step 430.

If it determined at step 422 that the name of the financial institution 109 is included in the list provided at step 420, the process flow 400 proceeds to step 426. At step 426, the customer 102 selects the name of the financial institution 109 from the list provided at step 420. At step 428, the customer 102 selects an account type associated with the financial institution 109. After selection of the name of the financial institution 109 and the account type, the process flow 400 proceeds to step 430. At step 430, the customer 102 selects an account associated with the FSBE 103 to which the funds are to be transferred from the financial institution 109. From step 430, the process flow 400 proceeds to step 432.

At step 432, it is determined whether the customer 102 agrees to transfer electronic bill payments associated with the account of the customer 102 at the financial institution 109 to the FSBE 103. If it is determined at step 432 that the customer 102 does not agree to transfer the electronic bill payments to the FSBE 103, the process flow 400 proceeds to step 433. At step 433, it is determined whether the customer 102 agrees to transfer funds from the financial institution 109 to the FSBE 103. If at step 433 the customer 102 declines to transfer funds, the process flow 400 ends at step 448. However, if the customer 102 agrees to transfer funds at step 433, the process flow proceeds to step 444.

Figure 7C:
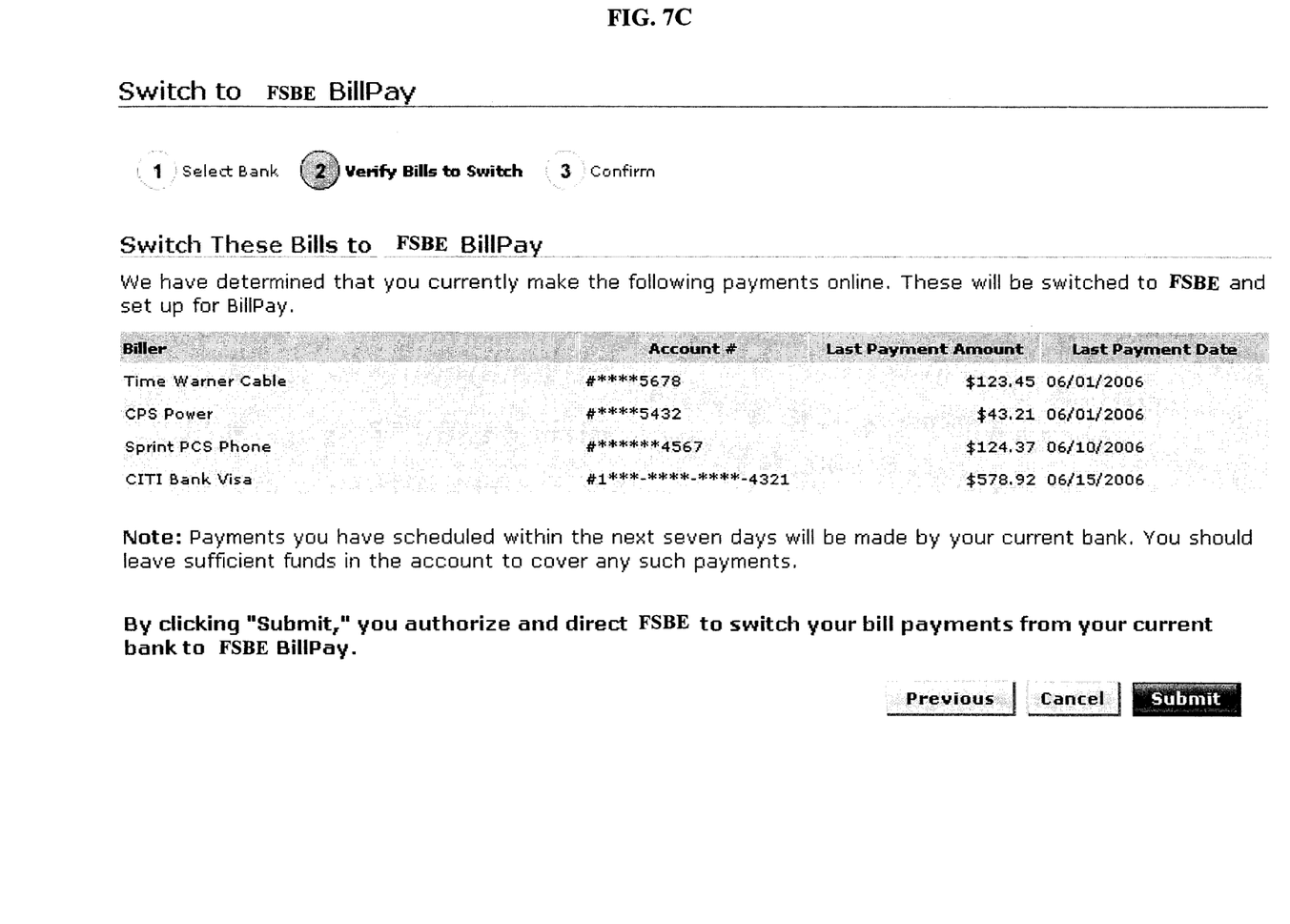
Figure 7D:
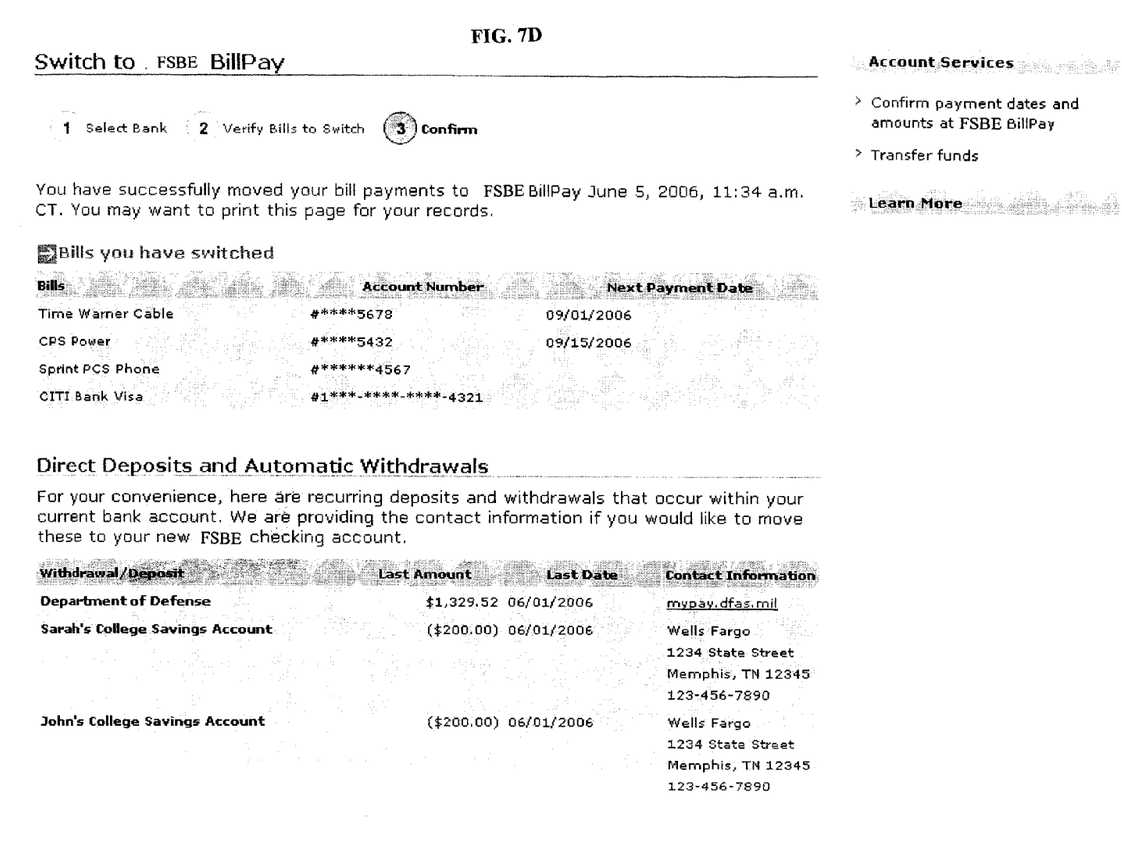

If it is determined at step 432 that the customer 102 has agreed to transfer the electronic bill payments to the FSBE 103, the process flow 400 proceeds to step 434. At step 434, the FSBE 103 extracts financial account information (e.g., electronic bill payment information) of the customer 102 associated with financial account at the financial institution 109, the extracted financial account information having been obtained by the aggregation tool 106. At step 436, various financial account information (e.g., electronic bill payment information) is displayed to the customer 102. FIGS. 7C-7D are illustrative interface screen shots relative to step 436. From step 436, the process flow 400 proceeds to step 438.

Figure 7E:
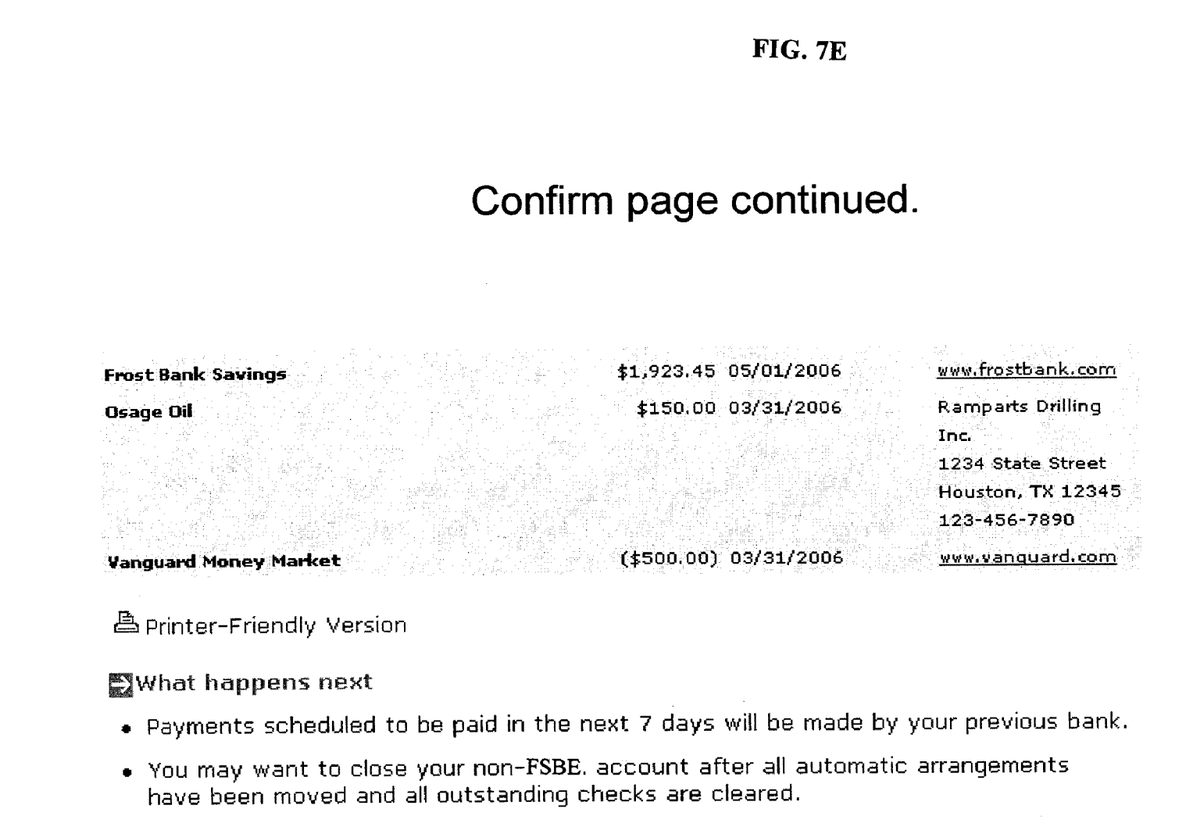

At step 438, the customer 102 determines whether the displayed financial account information is correct. If it is determined at step 438 that the displayed information is not correct, the process flow 400 returns to step 434. However, if it is determined at step 438 that the displayed information is correct, the process flow 400 proceeds to step 440. At step 440, confirmation that the financial account information (e.g., electronic bill payment) is correct is received from the customer 102. FIGS. 7D-7E are illustrative interface screen shots relative to step 440. At step 442, a notice may be sent on behalf of the customer 102 from the FSBE 103 to various entities with which the customer 102 has financial dealings. The entities may include, for example, an employer, lending companies, and the like. The notice informs various entities that the customer 102 has switched the financial account from the financial institution 109 to the FSBE 103.

In a typical embodiment, if an entity with which the customer 102 has financial transactions requires a wet signature from the customer 102, the FSBE 103 sends a wet signature of the customer 102 along with the notice at step 442. At step 444, the FSBE 103 initiates electronic funds transfer, using the funds transfer application 206, from the financial institution 109 to the FSBE financial institution 208 via the central banking system 214. At step 446, a notice along with a document signed by the customer 102 is sent on behalf of the customer 102 from the FSBE 103 to the financial institution 109 directing that financial account closure occur. The process flow 400 ends at step 448.

Figure 5:
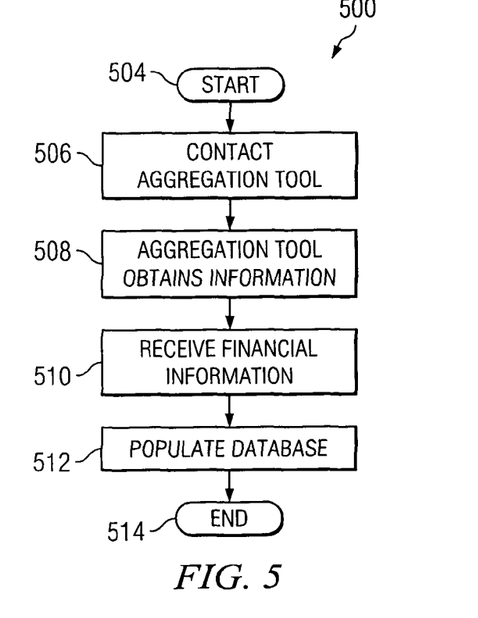
FIG. 5 is a flow diagram illustrating a process for acquiring customer financial account information.

FIG. 5 is a flow diagram illustrating a process for acquiring customer financial account information. A process flow 500 is typically performed by the financial services system 104 and will be described relative to the financial services system 104. Those having skill in the art will appreciate, however, that the process flow 500 need not necessarily be performed by the financial services system 104. In a typical embodiment, step 414 allows the customer 102 to activate the FSBE account switching application 204, which application launches the process flow 500.

The process flow 500 starts at step 504. At step 504, the financial services system 104 receives approval from the customer 102 via the account switching application 204 to electronically transfer a financial account from the financial institution 109 to the FSBE 103. Selection of the FSBE account switching application 204 allows the FSBE 103 to initiate electronic transfer of a financial account and financial obligations associated therewith of the customer 102 from the financial institution 109 to the FSBE 103.

Upon receiving the customer approval at step 504, the financial services system 104 contacts the aggregation tool 106 at step 506. The aggregation tool 106 may be, for example, operated by a third party entity or by the FSBE 103. Financial account information gathered by the aggregation tool 106 may include, for example, current financial account, savings and investment accounts, mortgage, credit cards, personal loans, direct deposits, and the like. The aggregation tool 106 is adapted to gather information regarding the financial obligations associated with the financial account of the customer 102 at the financial institution 109. In a typical embodiment, step 420 of FIG. 4 utilizes the financial account information from the account aggregation services provided by the aggregation tool 106 and launches step 508 of process flow 500. At step 508, the aggregation tool 106 obtains the financial account information and forwards same to the financial services system 104. The financial account information is received by the financial services system 104 at step 510. At step 512, the financial services system 104 utilizes the financial information received by the aggregation tool 106 to populate the FSBE services system 104. The process flow 500 ends at step 514.

Figure 6:
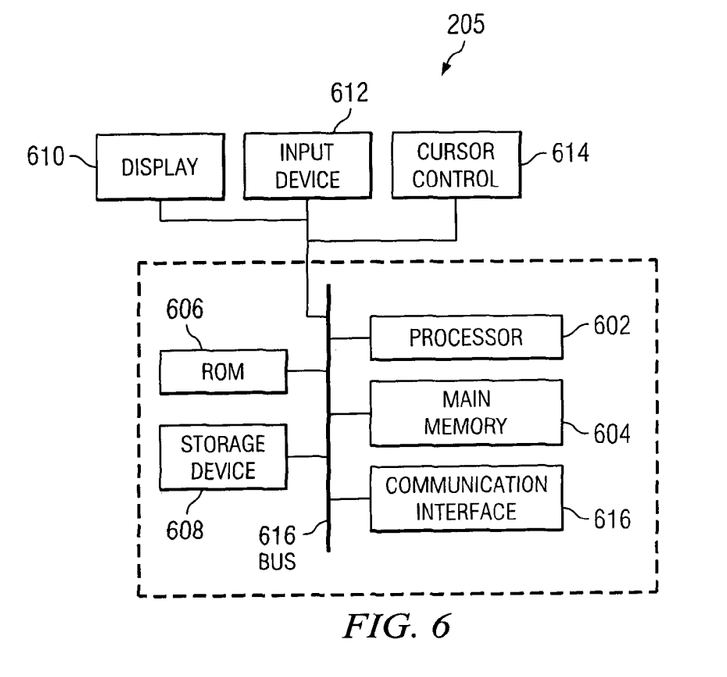
FIG. 6 illustrates an embodiment of a financial services system server.

FIG. 6 illustrates an embodiment of the financial services system server 205. In the implementation shown, the server 205 includes a bus 618 or other communication mechanism for communicating information and a processor 602 to the bus 618 for processing information. The server 205 also includes a main memory 604, such as a random access memory (RAM) or other dynamic storage device, coupled to the bus 618 for storing computer-readable instructions to be executed by the processor 602. The main memory 604 also may be used for storing temporary variables or other intermediate information during execution of the instructions to be executed by the processor 602. The server 205 further includes a read-only memory (ROM) 606 or other static storage device coupled to the bus 618 for storing static information and instructions for the processor 602. A computer-readable storage device 608, such as a magnetic disk or optical disk, is coupled to the bus 618 for storing information and instructions for the processor 602.

The server 205 may be coupled via the bus 618 to a display (not shown), such as a cathode ray tube (CRT), for displaying information to the customer 102. The information may be, for example, a web page to navigate and choose services. An input device 612, including, for example, alphanumeric and other keys, is coupled to the bus 618 for communicating information and command selections to the processor 602. Another type of user input device is a cursor control 614, such as a mouse, a trackball, or cursor-direction keys for communicating direction information and command selections to the processor 602 and for controlling cursor movement on the display (not shown). The cursor control 614 typically has two degrees of freedom in two axes, a first axis (e.g., x) and a second axis (e.g., y), that allow the device to specify positions in a plane.

The term "computer readable instructions" as used above refers to any instructions that may be performed by the processor 202 and/or other component of the server 200. Similarly, the term "computer readable medium" refers to any storage medium that may be used to store the computer readable instructions. Such a medium may take many forms, including, but not limited to, non volatile media, volatile media, and transmission media. Non volatile media include, for example, optical or magnetic disks, such as the storage device 208. Volatile media include dynamic memory, such as the main memory 204. Transmission media include coaxial cables, copper wire and fiber optics, including wires of the bus 218. Transmission can take the form of acoustic or light waves, such as those generated during radio frequency (RF) and infrared (IR) data communications. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The server 205 may also include a communication interface 616 coupled to the bus 618. The communication interface 616 provides a two-way data communication coupling between the server 205 and a network, such as the Internet. As an example, the communication interface 616 may be a local area network (LAN) card used to provide a data communication connection to a compatible LAN. Wireless links may also be implemented. In any such implementation, the communication interface 616 sends and receives electrical, electromagnetic, optical, or other signals that carry digital data streams representing various types of information.

The previous description is of embodiment(s) for implementing the methods and systems described herein, and the scope should not be limited by this description. The scope is instead defined by the following claims.

What is claimed is:

1. A computerized method of transferring a financial account from an existing financial institution to a new financial institution, the method comprising:
receiving, at a financial services computer, a request for financial account transfer from a customer;
providing, using an electronic communication interface of the financial services computer, the customer with a list of financial institution names;
receiving, at the financial services computer from the customer, a selection of an existing financial institution of the customer from the list of financial institution names;
determining, by a processor of the financial services computer, information regarding the existing financial institution using information stored in a memory at the new financial institution;
receiving, at the financial services computer via an aggregation tool, information regarding the financial account;
determining, by the processor, a financial account amount as a function of the received information such that the financial account amount includes pending debits associated with the financial account which are scheduled to be paid within a fixed time period and does not include pending debits which are scheduled to be paid beyond the fixed time period; and
determining, by the processor using the received information, a balance amount to transfer from the existing financial institution to the new financial institution, the balance amount being determined as a total amount of funds associated with the financial account less the determined financial account amount.

2. The method of claim 1, comprising receiving, at the financial services computer, security information from the customer to gain access to the financial account at the existing financial institution.

3. The method of claim 2, wherein the security information comprises a user name and a password.

4. The method of claim 3, wherein the aggregation tool utilizes the security information to gain access to the financial account at the existing financial institution.

5. The method of claim 1, wherein the information regarding the existing financial institution comprises a name and location of the existing financial institution.

6. The method of claim 1, wherein the information stored at the new financial institution comprises at least one of customer payment information and deposit information.

7. The method of claim 1, comprising the step of communicating with the existing financial institution to terminate the financial account.

8. The method of claim 1, wherein the information regarding the financial account comprises a type of the financial account, a financial account number, and a financial account balance.

9. The method of claim 1, wherein the information regarding the financial account comprises electronic bill payment information, automated withdrawal information, direct deposit information, and automatic funds transfer information.

10. The method of claim 1, wherein the step of determining the balance amount to transfer is performed by the new financial institution.

11. The method of claim 1, wherein the aggregation tool is operated by the new financial institution.

12. A system for transferring a financial account from an existing financial institution to a new financial institution comprising:
   a computer with a processor adapted to:
      provide a customer with a list of financial institution names;
      receive from the customer a selection of an existing financial institution of the customer from the list of financial institution names;
      receive a customer request for financial account transfer;
      determine information regarding the existing financial institution using information stored at the new financial institution;
      receive, via an aggregation tool, information regarding the financial account;
      determine a financial account amount as a function of the received information where the financial account amount is based on pending debits associated with the financial account which are scheduled to be paid within a fixed time period and not based on pending debits which are scheduled to be paid beyond the fixed time period;
      determine, using the received information, a balance amount to transfer from the existing financial institution to the new financial institution, the balance amount being determined as a total amount of funds associated with the financial account less the determined financial account amount; and
   a memory interoperably coupled to the computer.

13. The system of claim 12, wherein the processor is further adapted to receive security information from the customer to gain access to the financial account at the existing financial institution.

14. The system of claim 13, wherein the security information comprises a user name and a password.

15. The system of claim 14, wherein the aggregation tool utilizes the security information to gain access to the financial account at the existing financial institution.

16. The system of claim 12, wherein the information regarding the existing financial institution comprises a name and location of the existing financial institution.

17. The system of claim 12, wherein the information stored at the new financial institution comprises at least one of customer payment information and deposit information.

18. The system of claim 12, wherein the processor is further adapted to communicate with the existing financial institution to terminate the financial account.

19. The system of claim 12, wherein the received information comprises a type of the financial account, a financial account number, and a financial account balance.

20. The system of claim 12, wherein the received information comprises electronic bill payment information, automated withdrawal information, direct deposit information, and automatic funds transfer information.

21. The system of claim 12, wherein the processor determines financial obligations associated with the financial account using the received information and populates a database of the new financial institution to reflect the determined financial obligations.

22. The system of claim 12, wherein the aggregation tool is operated by the new financial institution.

23. An article of manufacture for transferring a financial account from an existing financial institution to a new financial institution, the article of manufacture comprising:
   at least one computer readable medium;
   processor instructions contained on the at least one computer readable medium, the processor instructions configured to be readable from the at least one computer readable medium by at least one processor and thereby cause the at least one processor to operate as to:
   provide a customer with a list of financial institution names;
   receive from the customer a selection of an existing financial institution of the customer from the list of financial institution names;
   receive a customer request for financial account transfer;
   determine information regarding the existing financial institution using information stored at the new financial institution;
   receive, via an aggregation tool, information regarding the financial account;
   determine a financial account amount as a function of the received information such that the financial account amount includes pending debits associated with the financial account which are scheduled to be paid within a fixed time period and does not include pending debits which are scheduled to be paid beyond the fixed time period; and
   determine, using the received information, a balance amount to transfer from the existing financial institution to the new financial institution, the balance amount being determined as a total amount of funds associated with the financial account less the determined financial account amount.

24. The article of manufacture of claim 23, wherein the processor instructions are configured to cause the at least one processor to receive security information from the customer to gain access to the financial account at the existing financial institution.

25. The article of manufacture of claim 24, wherein the security information comprises a user name and a password.

26. The article of manufacture of claim 25, wherein the aggregation tool utilizes the security information to gain access to the financial account at the existing financial institution.

27. The article of manufacture of claim 23, wherein the information regarding the existing financial institution comprises a name and location of the existing financial institution.

28. The article of manufacture of claim 23, wherein the information stored at the new financial institution comprises at least one of customer payment information and deposit information.

29. The article of manufacture of claim 23, wherein the processor instructions are configured to cause the at least one processor to operate as to communicate with the existing financial institution to terminate the financial account.

30. The article of manufacture of claim 23, wherein the received information comprises a type of financial account, a financial account number, and a financial account balance.

31. The article of manufacture of claim 23, wherein the received information comprises electronic bill payment information, automated withdrawal information, direct deposit information, and automatic funds transfer information.

32. The article of manufacture of claim 23, wherein the aggregation tool is operated by the new financial institution.

33. The article of manufacture of claim 23, wherein the processor instructions cause the at least one processor to operate as to determine financial obligations associated with the financial account using the received information and populate a database of the new financial institution to reflect the determined financial obligations.

* * * * *

UNITED STATES PATENT AND TRADEMARK OFFICE
CERTIFICATE OF CORRECTION

| | |
|---|---|
| PATENT NO. | : 8,121,947 B1 |
| APPLICATION NO. | : 11/548073 |
| DATED | : February 21, 2012 |
| INVENTOR(S) | : Ryan Ray Barth et al. |

Page 1 of 1

It is certified that error appears in the above-identified patent and that said Letters Patent is hereby corrected as shown below:

Column 9, line 48, delete "202" and insert --602--

Column 9, line 48, delete "200" and insert --205--

Column 9, line 55, delete "208" and insert --608--

Column 9, line 56, delete "204" and insert --604--

Column 9, line 58, delete "218" and insert --618--

Signed and Sealed this
Tenth Day of April, 2012

David J. Kappos
*Director of the United States Patent and Trademark Office*